United States Patent
Chow et al.

(10) Patent No.: US 10,891,298 B2
(45) Date of Patent: Jan. 12, 2021

(54) SYSTEMS AND METHODS FOR PACKAGE COMPONENT VISUALIZATIONS

(71) Applicant: salesforce.com, inc., San Francisco, CA (US)

(72) Inventors: Winston Chow, San Mateo, CA (US); Nathan Edward Lipke, Denver, CO (US); Michael Boilen, Kirkland, WA (US); Nicholas Chun Yuan Chen, San Francisco, CA (US); Jonathan Widjaja, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 566 days.

(21) Appl. No.: 15/471,610

(22) Filed: Mar. 28, 2017

(65) Prior Publication Data

US 2018/0285426 A1   Oct. 4, 2018

(51) Int. Cl.
   *G06F 9/44*      (2018.01)
   *G06F 16/248*    (2019.01)
   *G06F 16/25*     (2019.01)
   *G06F 8/33*      (2018.01)
   *G06F 16/958*    (2019.01)

(52) U.S. Cl.
   CPC ............ *G06F 16/248* (2019.01); *G06F 8/33* (2013.01); *G06F 16/25* (2019.01); *G06F 16/972* (2019.01)

(58) Field of Classification Search
   CPC ... G06F 8/33; G06F 8/34; G06F 16/25; G06F 16/248; G06F 16/972
   See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,740,440 A * | 4/1998 | West ..................... G06F 8/24 714/E11.217 |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Lewis A Bullock, Jr.
*Assistant Examiner* — Tina Huynh
(74) *Attorney, Agent, or Firm* — LKGlobal | Lorenz & Kopf

(57) ABSTRACT

Computing systems, database systems, and related methods are provided for providing visualizations of distributed package components. One exemplary method involves a server providing a graphical representation of a plurality of classes of a package, receiving a request to view a global class of the plurality of classes, obtaining previously compiled code associated with the global class of the from a database, filtering the code to include global source components of the global class while removing non-global source code components, and providing a graphical representation of the filtered code on the client device requesting presentation of the global class.

17 Claims, 6 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,237,135 B1 * | 5/2001 | Timbol .................... G06F 8/34 717/107 |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,037,364 B1 * | 7/2018 | Kalinichenko ....... G06F 16/248 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143949 A1 * | 10/2002 | Rajarajan ............. G06F 9/5055 709/226 |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0006765 A1 * | 1/2004 | Goldman ............. G06F 9/4492 717/116 |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0209319 A1 * | 8/2008 | Giormov ............. G06F 16/335 715/700 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0214064 A1 * | 9/2011 | Schneider .......... G06F 21/6218 715/741 |
| 2011/0247051 A1 | 10/2011 | Bulumulla et al. |
| 2011/0271250 A1 * | 11/2011 | Park ...................... G06F 8/33 717/113 |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0007700 A1 * | 1/2013 | Villar .................... G06F 8/33 717/109 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0268520 A1 * | 10/2013 | Fisher ............. G06F 16/2455 707/723 |
| 2017/0109933 A1 * | 4/2017 | Voorhees ............. G06T 11/206 |

* cited by examiner

SYSTEMS AND METHODS FOR PACKAGE COMPONENT VISUALIZATIONS

TECHNICAL FIELD

Embodiments of the subject matter described herein relate generally to database systems, and more particularly, to methods and systems for selectively providing visualizations of components of code packages in a database system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users. For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like).

Many platforms provide a virtual marketplace or storefront that allow users to customize his or her experience by incorporating additional code packages or "apps" that provide additional functionality on top of or integrated with the underlying platform. In the case of open source packages, the underlying source code and class structures may be available to installers or other users for reuse or modification. That said, other packages may hide or restrict access to underlying source code to preserve proprietary rights to developed intellectual property. However, restricting access to underlying components of such packages may limit their extensibility or desirability.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 depicts a GUI display generated in accordance with one or more exemplary embodiments of the global class visualization process of FIG. 2;

DETAILED DESCRIPTION

Embodiments of the subject matter described herein generally relate to methods and systems for selectively providing visualizations of certain components of a distributed code package in a database system. In this regard, a particular access modifier may be utilized to designate components of the code package that may be made available for presentation to other users, while other components associated or designated with different access modifiers may be hidden or otherwise restricted from presentation. For example, a "global" access modifier may be applied to a class and individual components thereof (e.g., constructors, methods, variables, properties, or the like) to enable graphical representations of the class and the global components thereof for other users within the database system, while other components of the global class that lack the global access modifier are hidden or restricted from presentation. In exemplary embodiments, a visualization of a global class is generated by filtering a compiled version of the source code for the global class, thereby ensuring that the displayed filtered code can be compiled. In this regard, in some embodiments, the visualizations of global methods within a global class are modified to return nothing if the method signature specified void or a null value to ensure compilability of the method while abstracting the underlying details of the method (e.g., the non-global components of a global method are filtered from the compiled code). While the subject matter may be described herein in the context of an on-demand database system, the subject matter is not necessarily limited to on-demand application or database systems, multi-tenant systems, or any other particular system architecture or arrangement described herein.

Figure 1:
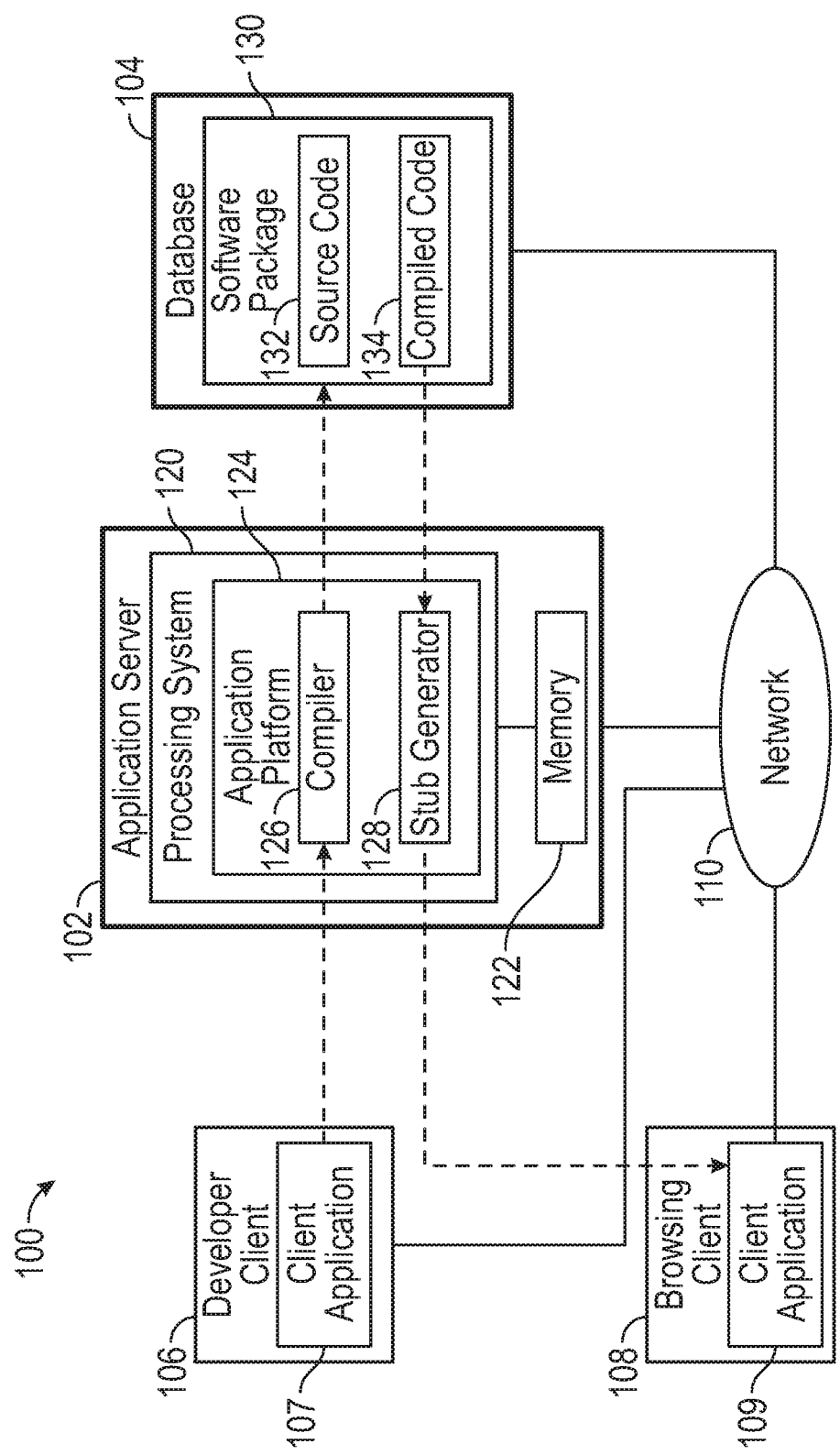
FIG. 1 is a block diagram of an exemplary database system.

FIG. 1 depicts an exemplary embodiment of a database system 100 including a server 102 and a database 104 capable of supporting selective visualizations of components of code packages, which are distributed and managed using the database system 100. As used herein, a code package should be understood as referring to a bundle of components that make up an application or piece of functionality that may be integrated with or otherwise supported by an application platform, an operating system, or the like. In this regard, the source code and other components of the package may be clustered or otherwise logically contained in a manner that allows for code migration, editing in an integrated development environment, or distribution. A "managed code package," "distributed code package," or variants thereof should be understood as referring to a code package that is published or otherwise made available to other users for installation or integration within their respective instances of a particular application supported by the system 100.

In one or more exemplary embodiments, by default, classes and other components of the source code of a managed package are restricted from presentation for users other than the creator, owner, or originator of the package. However, in embodiments described herein, classes or other components that are declared with a particular visualization access modifier are capable of being selectively presented to other users while restricting presentation of other classes or components of the managed package. Thus, the creator, owner, or originator is capable of selectively controlling which classes or other components of a managed package may be made available to view by others, which, in turn, improves extensibility of those components of the package while protecting other components of the package regarded as proprietary.

The server 102 generally represents a computing device, computing system or another combination of processing logic, circuitry, hardware, and/or other components configured to support the visualization processes and related tasks, operations, and/or functions described herein. In this regard, the server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random access memory (RAM), read only memory (ROM), flash memory, magnetic or optical mass storage, or any other suitable non-transitory short or long term data storage or other computer-readable media, and/or any suitable combination thereof. In one or more embodiments, the programming instructions cause the processing system 120 to create, generate, or otherwise facilitate the application platform 124 that generates or otherwise provides instances of a virtual application at run-time (or "on-demand") on client devices 106, 108 communicatively coupled to the server 102 via a communications network 110 based at least in part upon code and other data that is stored or otherwise maintained by the database 104. In this regard, the database 104 may store or otherwise maintain data for integration with or invocation by an instance of a virtual application supported by the application platform 124. For purposes of explanation but without limitation, the server 102 may alternatively be referred to herein as an application server 102.

In exemplary embodiments described herein, the programming instructions stored in the memory 122 (or alternatively database 104) cause the processing system 120 to support, generate or otherwise facilitate a compiler 126 that supports compiling source code developed within an integrated development environment (IDE) within an instance of a virtual application provided by the application platform 124. As described in greater detail below, the source code and corresponding compiled versions thereof may be stored or otherwise maintained in the database 104 in association with a particular code package. Additionally, the programming instructions cause the processing system 120 to support, generate or otherwise facilitate a stub generator 128 capable of providing visualizations of compiled source code associated with a code package and stored in the database 104, as described in greater detail below.

The client devices 106, 108 generally represent any sort of electronic device coupled to the network 110 that may be utilized by a user to access the application platform 124 on the application server 102 to access instances of applications supported by the database system 100 and/or retrieve data from the database 104 via the network 110, which may be realized as any sort or combination of wired and/or wireless computer network, a cellular network, a mobile broadband network, a radio network, the Internet, or the like. In practice, a client device 106, 108 can be realized as any sort of personal computer, mobile telephone, tablet or other network-enabled electronic device. In exemplary embodiments, the client devices 106, 108 include a display device, such as a monitor, screen, or another conventional electronic display, capable of graphically presenting data and/or information provided by the application platform 124 along with a user input device, such as a touchscreen, a touch panel, a mouse, a joystick, a directional pad, a motion sensor, or the like, capable of receiving input from the user of the client device 106, 108. Each client device 106, 108 executes a respective instance of a client application 107, 109 that communicates with the application platform 124 on the server 102 using a networking protocol. In some embodiments, the client application 107, 109 is realized as a web browser or similar client application executed by the client device 106, 108 that contacts the application server 102 and/or application platform 124 using a networking protocol, such as the hypertext transport protocol (HTTP) or the like, to access or otherwise initiate an instance of a virtual application presented on the client device 106, 108.

In exemplary embodiments, the database 104 stores or otherwise maintains a code package object 130 corresponding to a managed code package available for distribution within the database system 100. The code package object 130 includes source code 132 associated with the managed code package along with corresponding compiled versions of the source code 134 in association with the managed code package. The code package object 130 may be created or otherwise instantiated in response to a developer user associated with a client device 106 manipulating a client application 107 to develop or otherwise write the source code 132 for the code package and then saving or otherwise storing the code package in the database 104. For example, a software developer may utilize the client device 106 and/or the client application 107 to access an IDE within an instance of a virtual application provided by the application server 102 and/or application platform 124 to create a plurality of classes associated with the code package and utilize a source code editor of the IDE to write or otherwise define the code associated with the respective classes.

After defining the source code 132 and other components of the code package, the developer may select a button or similar graphical user interface (GUI) element of the IDE, browser, or the like to save, upload, or otherwise store the code package within the system 100, which, in turn results in the compiler 126 compiling the source code 132 to obtain a corresponding compiled version 134 of the source code 132 which may be stored in association with the source code 132 as part of a code package object 130. The compiled source code 134 may be realized as bytecode or some other executable sequence of programming instructions in an assembly language, machine code, binary, or lower level programming language that differs from the programming language associated with the source code 132. In this regard, comments or other non-executable components of the source code 132 may be removed or otherwise absent from the compiled version 134 of the source code 132. In one embodiment, the compiled source code 134 is realized as bytecode that can be retrieved and executed at run-time without having to performing compilation.

In the case of a managed or distributed code package, the developer also utilizes the IDE to set permissions associated with the code package object 130 or otherwise publishes the code package object 130, thereby making the code package object 130 available to other users of the database system 100. For example, the application server 102 and/or the application platform 124 may support a virtual marketplace, store, or the like that allows for browsing, purchasing and/or downloading code packages from the database 104, wherein the permissions associated with the code package object 130 enable a graphical representation of the code package object 130 to be presented within the virtual marketplace.

Thereafter, other users within the database system 100 may select or otherwise identify the code package object 130 for installation or integration with his or her associated instance(s) of virtual application(s) within the database system 100. For example, a user of another client device 108 may utilize a client application 109 to access the virtual marketplace supported by the application server 102 and/or application platform 124 and select or otherwise identify the code package object 130 for installation and integration with his or her instance(s) of virtual application(s). After purchasing, installing, or otherwise selecting the code package object 130, the user of the client device 108 may utilize the client device 108 and/or the client application 109 to access the IDE within an instance of a virtual application provided by the application server 102 and/or application platform 124 to view the classes and other components associated with the code package object 130. The source code of particular classes lacking the global access modifier is hidden or otherwise restricted from view within a source code editor of the IDE, while visualizations of global classes and global source code components contained therein may be presented on the client device 108 within the source code editor of the virtual application presented within the client application 109. In this regard, for a global class, the stub generator 128 obtains the compiled code 134 corresponding to that class from the database 104 and analyzes the compiled version of the global class to filter or otherwise redact non-global source code components of the global class from the visualization of the class. Additionally, the stub generator 128 may modify or markup other aspects of the global class to ensure compilability, as described in greater detail below. Thus, a browsing user may view global aspects of the source code 132 of the global class associated with a code package object 130 in a manner that supports extensibility and understanding of global components of that global class without compromising intellectual property rights or proprietary aspects of the source code.

Figure 2:
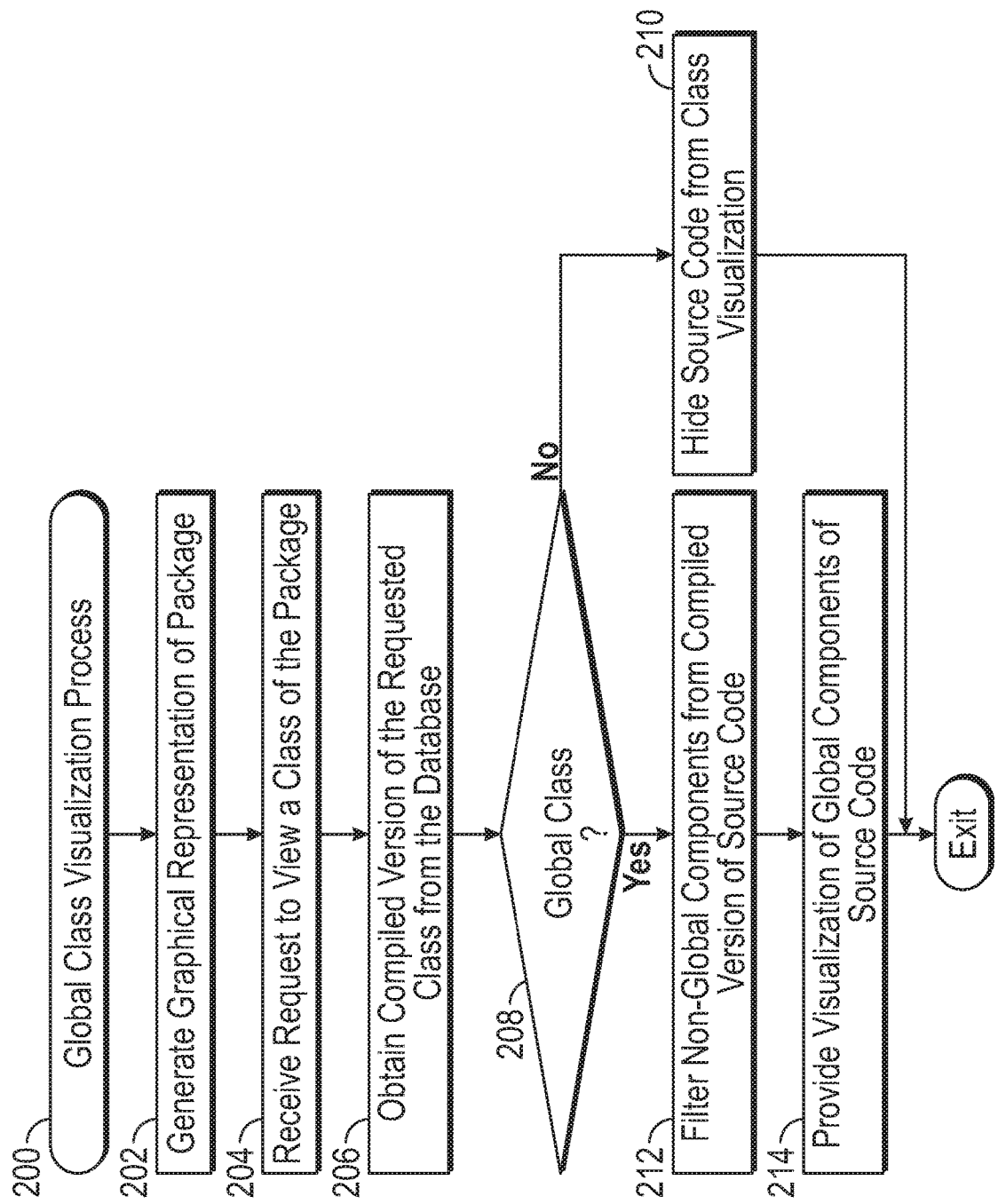
FIG. 2 is a flow diagram of an exemplary global class visualization process suitable for implementation in the database system of FIG. 1 in accordance with one or more embodiments.

FIG. 2 depicts an exemplary embodiment of a global class visualization process 200 suitable for implementation in a computing system to provide selective visualizations of package components having a particular access modifier while obscuring, redacting, or otherwise restricting presentation of package components having other access modifiers. For illustrative purposes, the following description may refer to elements mentioned above in connection with FIG. 1. In this regard, while portions of the visualization process 200 may be performed by different elements of the database system 100, for purposes of explanation, the subject matter is described herein primarily in the context of the visualization process 200 being performed by the application platform 124 and/or stub generator 128 that are implemented or executed by the processing system 120 at the server 102. It should be appreciated that the visualization process 200 may include any number of additional or alternative tasks, the tasks need not be performed in the illustrated order and/or the tasks may be performed concurrently, and/or the visualization process 200 may be incorporated into a more comprehensive procedure or process having additional functionality not described in detail herein. Moreover, one or more of the tasks shown and described in the context of FIG. 2 could be omitted from a practical embodiment of the visualization process 200 as long as the intended overall functionality remains intact.

The illustrated visualization process 200 begins by generating or otherwise providing a graphical representation of a code package on a client device (task 202). In this regard, a user may manipulate the client device 108 and/or client application 109 to interact with the application platform 124 on the server 102 to browse the database 104 for an accessible code package 130 that he or she would like to view. For example, a GUI display including a listing of code packages that the user has installed may be presented on the client device 108 within the client application 109. As another example, a virtual marketplace GUI display including a listing of managed or distributed code packages available for installation may be presented on the client device 108, thereby allowing the user to browse managed code packages that have been published and uploaded to the database 104. That said, in some embodiments, visualizations are limited in the marketplace so that users can only browse the code of managed packages that they have already purchased, installed, or otherwise integrated into their respective instances of an application.

In exemplary embodiments, a browsing user may manipulate a user input of the client device 108 to select or otherwise indicate the code package 130 that the user would like to view, and thereby transmit an identifier or other indicia associated with the code package 130 to the server 102 via the network 110. Using the identifier received from the client, the application platform 124 may query the database 104 to obtain information associated with the code package object 130 associated with the identifier that the classes and potentially other higher level components of the source code 132 of the code package 130. For example, in one embodiment, the database 104 stores a listing of the components of the package that are cross-referenced, loaded or otherwise associated with the browsing user's data on the database 104 (e.g., in association with the browsing user's user identifier, tenant identifier, and/or the like) and a package identifier associated with the package 130 where those components originate. The application platform 124 then generates or otherwise provides a graphical representation of the classes and other higher level components associated with the code package 130 on the client device 108. For example, the application platform 124 may provide an IDE GUI display that includes region having a listing of the classes associated with the selected code package object 130.

Thereafter, the illustrated visualization process 200 continues by receiving a request to view a class associated with the code package and retrieving or otherwise obtaining a compiled version of the requested class from the database (tasks 204, 206). For example, the user may manipulate a user input of the client device 108 to select or otherwise indicate the class associated with the code package 130 that the user would like to view from within a listing of the classes associated with the selected code package object 130. The client device 108 then transmits the name, identifier or other indicia associated with the selected class to the server 102 via the network 110. In response to receiving the request for a class, the application platform 124 retrieves the compiled version 134 of the selected class from the code package object 130 in the database 104.

After obtaining the compiled version of the selected class, the visualization process 200 continues by verifying or otherwise determining whether the selected class is associated with an access modifier that permits selective viewing of its source code components by browsing users (task 208). In some embodiments, the application platform 124 may first determine that the user does not have full permissions to view the code package object 130, for example, by determining or verifying that the user identifier, tenant identifier, and/or another identifier associated with the user of the client device 108 does not match a corresponding identifier associated with the code package object 130. Thereafter, the application platform 124 may analyze the access modifier associated with the retrieved compiled version of the selected class to verify that the associated access modifier permits selective viewing by the requesting user. In this regard, in the absence of an access modifier that permits selective viewing, the visualization process 200 hides, redacts, or otherwise prevents presentation of the source code components of the selected class on the client device (task 210). For example, the source code editor region of the IDE GUI display may be presented as being empty or some other indicia to the user that the source code of the selected class cannot be viewed by the user.

When the selected class is designated or otherwise associated with an access modifier that permits selective viewing, the visualization process 200 continues by filtering, redacting, or otherwise excluding source code components of the selected class that lack that access modifier from the obtained compiled source code for the selected class (task 212). For example, for a selected global class of the code package object 130, the application platform 124 may provide the retrieved compiled version 134 of the selected global class to the stub generator 128 which analyzes the compiled source code to identify non-global components within the class and filters or otherwise removes those components from the retrieved code to obtain a filtered version of the compiled version of the source code for the selected class. In this regard, the stub generator 128 may decompile or otherwise convert the compiled version 134 of the selected global class from the compiled language to the programming language associated with the source code 132, thereby generating a visualizable version of the compiled source code 134 in the original programming language. For purposes of explanation, the source code generated by the stub generator 128 based on the compiled code 134 may alternatively be referred to herein as decompiled for purposes of explanation, but without limitation, and it should be appreciated that the subject matter described herein does not necessarily require actual decompiling to convert or generate a source code representation of the compiled code 134. The stub generator 128 may then analyze and filter the decompiled source code based on access modifiers in the original source code language to remove non-global source code components from the decompiled source code to obtain filtered decompiled class source code including only global source code components. Additionally, the stub generator 128 may identify global methods within the filtered decompiled class source code and modify or otherwise replace the method to return a null value or simply nothing. The stub generator 128 may also insert a comment within the filtered decompiled class source code that explains or otherwise indicates that the filtered decompiled class source code does not depict the actual compiled source code corresponding to the selected class.

Still referring to FIG. 2, after filtering or otherwise modifying the compiled version of the source code of the selected viewable class, the visualization process 200 generates or otherwise provides a visualization of the filtered source code of the selected class that includes graphical representations of source code components of the selected class that were designated with the access modifier that permits selective viewing (task 214). In this regard, the application platform 124 and/or the stub generator 128 may utilize the filtered decompiled class source code to generate or otherwise provide a visualization of the selected global class within the source code editor region of the IDE GUI display on the client device 108. The visualization of the filtered decompiled class source code includes graphical representations of any of the global constructors, global methods (including the modified null method returns), global variables, global properties, and/or other source code components of the global class that were declared or designated with the global access modifier, along with graphical representations of any annotations or other modifications introduced by the stub generator 128.

Figure 3:
FIGS. 3-4 depicts exemplary graphical user interface (GUI) displays depicting different visualizations of a global class of a managed code package which are suitable for implementation in the database system of FIG. 1, where
Figure 4:
Figure 5:
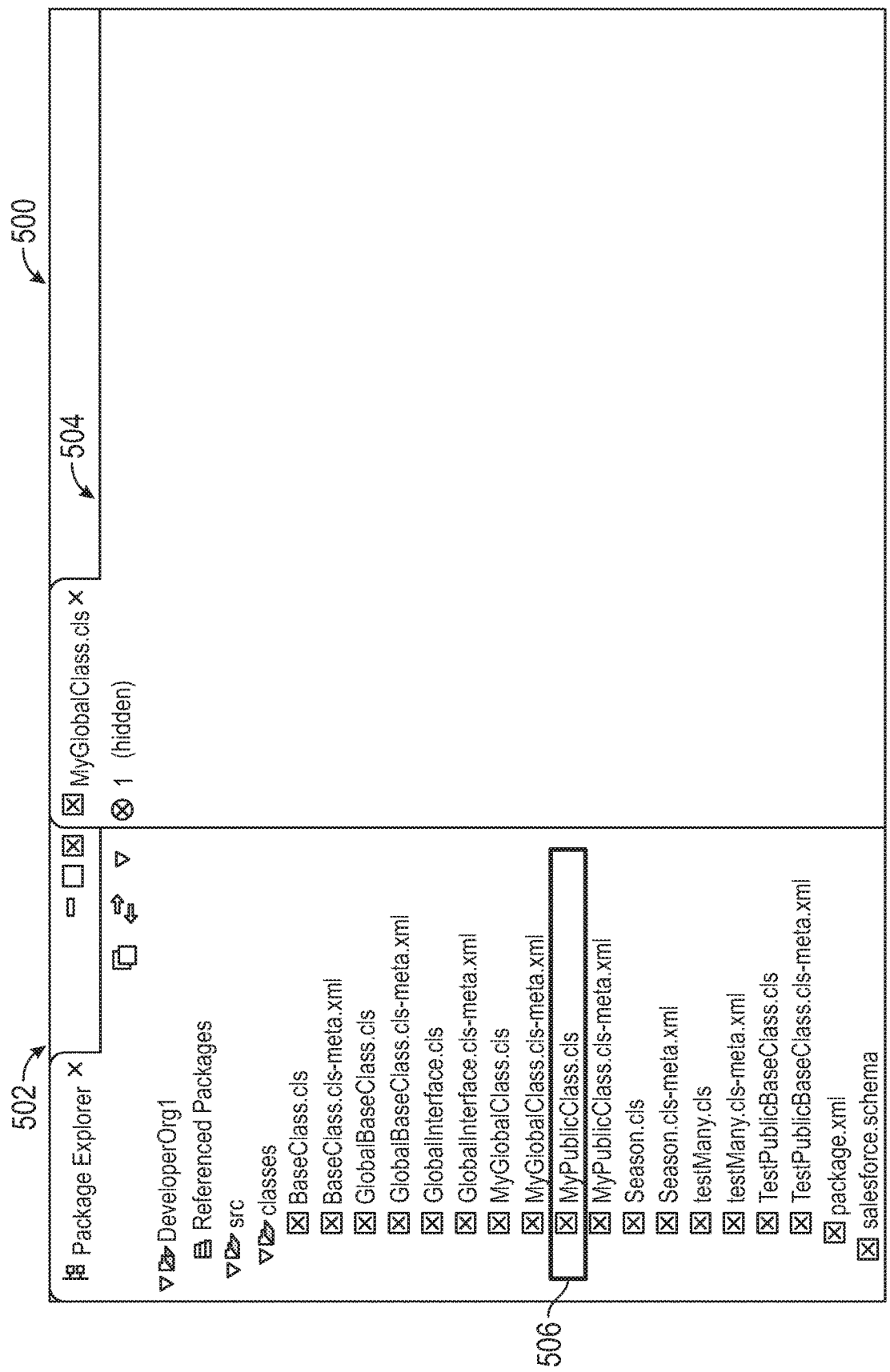
FIG. 5 depicts an exemplary GUI display depicting a visualization of a non-global class of a managed code package suitable for implementation in the database system of FIG. 1 in accordance with an exemplary embodiment of the global class visualization process of FIG. 2.

FIGS. 3-5 depict exemplary GUI displays that may be presented on a client device 106, 108 in the database system 100. In this regard, FIGS. 3-4 depict different visualizations of a global class of a managed code package illustrating the difference between the visualization of the global class provided to a creator, originator, or other developer associated with the managed code package (GUI display 300) versus the visualization of the global class that is provided to a browsing user (GUI display 400) in conjunction with the visualization process 200. FIG. 5 depicts the visualization of a non-global class that is provided to browsing users in conjunction with the visualization process 200.

Referring to FIG. 3 with reference to FIG. 1, in exemplary embodiments, the application platform 124 generates or otherwise provides the IDE GUI display 300 on a developer client device 106 in the course of the source code 132 of the code package 130 being written, modified, or otherwise developed. The IDE GUI display 300 includes a package navigation region 302 (or package explorer) that includes a listing of the classes and other higher level components associated with the code package 130 and a source code editor region 304 that includes a visualization of the source code associated with a global class 306 (MyGlobalClass.cls) selected within the package explorer 302. In this regard, because the GUI display 300 is presented to a developer user, the source code editor region 304 includes global components of the selected class along with source code components designated with other access modifiers, such as public, private, protected, or the like. The developer user may utilize the source code editor region 304 to edit or otherwise modify the source code of the selected global class and then save, upload, or otherwise publish the code package 130 and the selected global class to the database 104 for distribution to other browsing users.

FIG. 4 depicts an exemplary IDE GUI display 400 that may be presented within a client application 109 on a client device 108 of a user that has installed the managed code package 130 depicted in FIG. 3 or has otherwise selected the managed code package 130 depicted in FIG. 3 for viewing. Similar to FIG. 3, the IDE GUI display 400 includes a package navigation region 402 (or package explorer) that includes a listing of the classes and other higher level components associated with the code package 130 (e.g., task 202) and a source code editor region 404 for presenting the source code associated with a class. In response to selection of a class 406 within the package explorer 402, the selected class 406 is rendered or otherwise indicated as selected within the package explorer 402 using one or more visually distinguishable characteristics or graphical effects to highlight the selected class 406 relative to other classes and components of the package, and the client device 108 transmits a request to the application platform 124 that identifies the MyGlobalClass.cls as the selected class. In response to receiving the request (e.g., task 204), the application platform 124 retrieves the compiled version 134 of the MyGlobalClass.cls class from the database 104 (e.g., task 206) and analyzes the compiled MyGlobalClass.cls class source code 134 to determine the accesses modifier associated with the class (e.g., task 208).

In response to determining the selected class 406 is designated or otherwise declared with the global access modifier that permits selective viewing, the stub generator 128 provided by the application platform 124 automatically filters the compiled MyGlobalClass.cls class source code 134 that was obtained from the database 104 to remove any source code components that lack the global access modifier, such as, for example, any private source code components, any public source code components, and the like (e.g., task 212). Additionally, the stub generator 128 identifies any global methods within the filtered decompiled MyGlobalClass.cls class source code and modifies the returns of those methods to return a null value. In exemplary embodiments, the stub generator 128 also inserts a comment prefacing the global components of the generated source code visualization that explains the presented source code is modified from the original version. In this regard, template text for the annotation may be stored or otherwise maintained by the server 102 (e.g., in memory 122) or in the database 104 for reference or retrieval by the stub generator 128.

As illustrated in FIG. 4, the resulting filtered decompiled MyGlobalClass.cls class source code is presented within the source code editor region 404 (e.g., task 214). The visualization of the MyGlobalClass.cls source code is prefaced with a graphical representation of the annotation 410 that was automatically generated and inserted by the stub generator 128 followed by the global components of the MyGlobalClass.cls source code. In this regard, the source code editor region 404 depicts a graphical representation of the declaration of the global class 412, graphical representations of global properties 414 of the class, and graphical representations of global methods 416, 418 of the class. In the illustrated embodiment, the arguments of a global method 418 receiving multiple arguments are depicted to show the full signature of global methods that receive multiple arguments. That said, as described above, the return of the global method 418 is also modified to return null.

Conversely, FIG. 5 depicts an exemplary IDE GUI display 500 that may be presented within a client application 109 on a client device 108 of browsing user when the user selects a class 506 from within the package explorer 502 that lacks an access modifier that permits selective visualizations by browsing users. As described above, the entirety of the source code of the selected class 506 is restricted from presentation, resulting in a blank or empty source code editor region 504 (e.g., task 210). Thus, developers may utilize the global access modifier to permit selective visualizations of select classes or components of a code package while still restricting presentation of other classes or components of the code package lacking the particular access modifiers.

Referring to FIGS. 1-5, in accordance with one embodiment, a global access modifier means the method, variable, property, or other source code component can be used by any code that has access to the global class, a private access modifier means that a source code component is accessible only within the class in which it is defined, a public access modifier means that a source code component can be used by class or code within the same application or namespace, and a protected access modifier means that a source code component is only visible to inner classes within the class in which it is defined.

Figure 6:
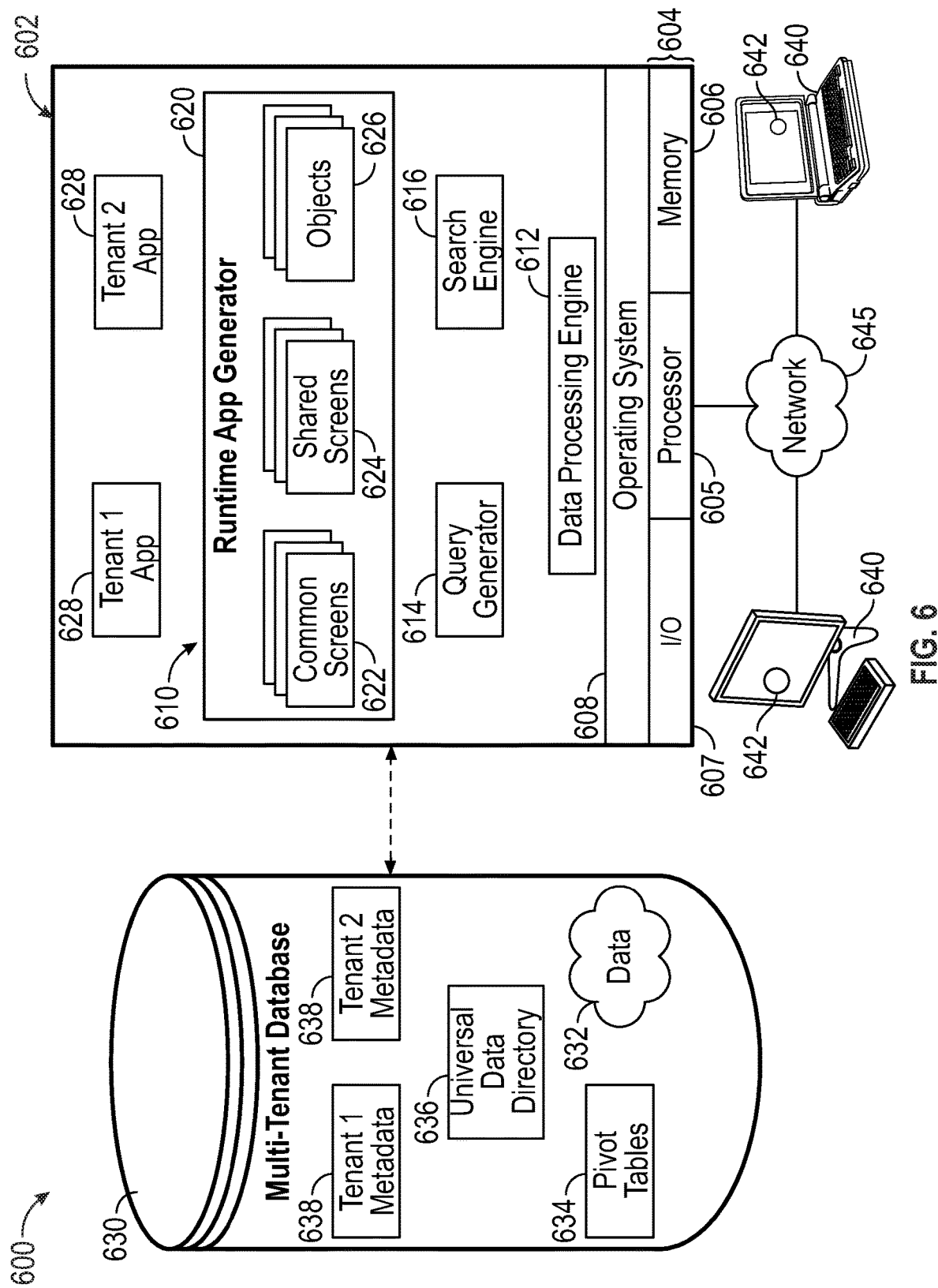
FIG. 6 is a block diagram of an exemplary multi-tenant system suitable for use with the database system of FIG. 1 in accordance with one or more embodiments.

FIG. 6 depicts an exemplary embodiment of an on-demand multi-tenant database system 600 suitable for use with the visualization process 200 of FIG. 2 or the database system 100 of FIG. 1. The illustrated multi-tenant system 600 of FIG. 6 includes a server 602, such as server 102, that dynamically creates and supports virtual applications 628 based upon data 632 from a common database 630 (e.g., database 104) that is shared between multiple tenants, alternatively referred to herein as a multi-tenant database. Data and services generated by the virtual applications 628 are provided via a network 645 (e.g., network 110) to any number of client devices 640 (e.g., client devices 106, 108 or the like), as desired. Each virtual application 628 is suitably generated at run-time (or on-demand) using a common application platform 610 (e.g., application platform 124) that securely provides access to the data 632 in the database 630 for each of the various tenants subscribing to the multi-tenant system 600. In accordance with one non-limiting example, the multi-tenant system 600 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 630. In this regard, each tenant includes one or more users associated with, assigned to, or otherwise belonging to that respective tenant. To put it another way, each respective user within the multi-tenant system 600 is associated with, assigned to, or otherwise belongs to a particular tenant of the plurality of tenants supported by the multi-tenant system 600. Tenants may represent customers, customer departments, business or legal organizations, and/or any other entities that maintain data for particular sets of users within the multi-tenant system 600 (i.e., in the multi-tenant database 630). For example, the application server 602 may be associated with one or more tenants supported by the multi-tenant system 600. Although multiple tenants may share access to the server 602 and the database 630, the particular data and services provided from the server 602 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 632 belonging to or otherwise associated with other tenants.

The multi-tenant database 630 is any sort of repository or other data storage system capable of storing and managing the data 632 associated with any number of tenants. The database 630 may be implemented using any type of conventional database server hardware. In various embodiments, the database 630 shares processing hardware 604 with the server 602. In other embodiments, the database 630 is implemented using separate physical and/or virtual database server hardware that communicates with the server 602 to perform the various functions described herein. In an exemplary embodiment, the database 630 includes a database management system or other equivalent software capable of determining an optimal query plan for retrieving and providing a particular subset of the data 632 to an instance of virtual application 628 in response to a query initiated or otherwise provided by a virtual application 628. The multi-tenant database 630 may alternatively be referred to herein as an on-demand database, in that the multi-tenant database 630 provides (or is available to provide) data at run-time to on-demand virtual applications 628 generated by the application platform 610.

In practice, the data 632 may be organized and formatted in any manner to support the application platform 610. In various embodiments, the data 632 is suitably organized into a relatively small number of large data tables to maintain a semi-amorphous "heap"-type format. The data 632 can then be organized as needed for a particular virtual application 628. In various embodiments, conventional data relationships are established using any number of pivot tables 634 that establish indexing, uniqueness, relationships between entities, and/or other aspects of conventional database organization as desired. Further data manipulation and report formatting is generally performed at run-time using a variety of metadata constructs. Metadata within a universal data directory (UDD) 636, for example, can be used to describe any number of forms, reports, workflows, user access privileges, business logic and other constructs that are common to multiple tenants. Tenant-specific formatting, functions and other constructs may be maintained as tenant-specific metadata 638 for each tenant, as desired. Rather than forcing the data 632 into an inflexible global structure that is common to all tenants and applications, the database 630 is organized to be relatively amorphous, with the pivot tables 634 and the metadata 638 providing additional structure on an as-needed basis. To that end, the application platform 610 suitably uses the pivot tables 634 and/or the metadata 638 to generate "virtual" components of the virtual applications 628 to logically obtain, process, and present the relatively amorphous data 632 from the database 630.

Referring again to FIGS. 1-5 with reference to FIG. 6, in one example, a managed code package 130 maintained in the database 104, 630 may be stored in association with a particular tenant identifier associated with a developer of the code package that allows multiple different users associated with that particular developer tenant to view, access, or modify the source code 132 associated with that code package 130. However, additional fields or permissions associated with the managed code package 130 maintained in the database 104, 630 may be configured to allow other users having other associated tenant identifiers to view, access, install, or otherwise incorporate the managed code package 130 into their respective instances of the virtual application 628. That said, the visualization process 200 may be applied to those other users having different associated tenant identifiers when they attempt to view or access the managed code package 130 maintained in the database 104, 630, resulting in the restricted visualizations limited to global components of the managed code package 130, as described above. It should be noted that in practice, different users or tenants may install different versions of a distributed code package, so that different browsing users associated with different tenants may be presented with different visualizations corresponding to the respective version of the distributed code package that has been purchased, installed, or otherwise integrated for that respective user or tenant.

Referring again to FIG. 6, the server 602 is implemented using one or more actual and/or virtual computing systems that collectively provide the dynamic application platform 610 for generating the virtual applications 628. For example, the server 602 may be implemented using a cluster of actual and/or virtual servers operating in conjunction with each other, typically in association with conventional network communications, cluster management, load balancing and other features as appropriate. The server 602 operates with any sort of conventional processing hardware 604, such as a processor 605, memory 606, input/output features 607 and the like. The input/output features 607 generally represent the interface(s) to networks (e.g., to the network 645, or any other local area, wide area or other network), mass storage, display devices, data entry devices and/or the like. The processor 605 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 606 represents any non-transitory short or long term storage or other computer-readable media capable of storing programming instructions for execution on the processor 605, including any sort of random access memory (RAM), read only memory (ROM), flash memory, magnetic or optical mass storage, and/or the like. The computer-executable programming instructions, when read and executed by the server 602 and/or processor 605, cause the server 602 and/or processor 605 to create, generate, or otherwise facilitate the application platform 610 and/or virtual applications 628 and perform one or more additional tasks, operations, functions, and/or processes described herein. It should be noted that the memory 606 represents one suitable implementation of such computer-readable media, and alternatively or additionally, the server 602 could receive and cooperate with external computer-readable media that is realized as a portable or mobile component or application platform, e.g., a portable hard drive, a USB flash drive, an optical disc, or the like.

The application platform 610 is any sort of software application or other data processing engine that generates the virtual applications 628 that provide data and/or services to the client devices 640. In a typical embodiment, the application platform 610 gains access to processing resources, communications interfaces and other features of the processing hardware 604 using any sort of conventional or proprietary operating system 608. The virtual applications 628 are typically generated at run-time in response to input received from the client devices 640. For the illustrated embodiment, the application platform 610 includes a bulk data processing engine 612, a query generator 614, a search engine 616 that provides text indexing and other search functionality, and a runtime application generator 620. Each of these features may be implemented as a separate process or other module, and many equivalent embodiments could include different and/or additional features, components or other modules as desired.

The runtime application generator 620 dynamically builds and executes the virtual applications 628 in response to specific requests received from the client devices 640. The virtual applications 628 are typically constructed in accordance with the tenant-specific metadata 638, which describes the particular tables, reports, interfaces and/or other features of the particular application 628. In various embodiments, each virtual application 628 generates dynamic web content that can be served to a browser or other client program 642 associated with its client device 640, as appropriate.

The runtime application generator 620 suitably interacts with the query generator 614 to efficiently obtain multi-tenant data 632 from the database 630 as needed in response to input queries initiated or otherwise provided by users of the client devices 640. In a typical embodiment, the query generator 614 considers the identity of the user requesting a particular function (along with the user's associated tenant), and then builds and executes queries to the database 630 using system-wide metadata 636, tenant specific metadata 638, pivot tables 634, and/or any other available resources. The query generator 614 in this example therefore maintains security of the common database 630 by ensuring that queries are consistent with access privileges granted to the user and/or tenant that initiated the request. In this manner, the query generator 614 suitably obtains requested subsets of data 632 accessible to a user and/or tenant from the database 630 as needed to populate the tables, reports or other features of the particular virtual application 628 for that user and/or tenant.

Still referring to FIG. 6, the data processing engine 612 performs bulk processing operations on the data 632 such as uploads or downloads, updates, online transaction processing, and/or the like. In many embodiments, less urgent bulk processing of the data 632 can be scheduled to occur as processing resources become available, thereby giving priority to more urgent data processing by the query generator 614, the search engine 616, the virtual applications 628, etc.

In exemplary embodiments, the application platform 610 is utilized to create and/or generate data-driven virtual applications 628 for the tenants that they support. Such virtual applications 628 may make use of interface features such as custom (or tenant-specific) screens 624, standard (or universal) screens 622 or the like. Any number of custom and/or standard objects 626 may also be available for integration into tenant-developed virtual applications 628. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 626 such as "account" objects, "opportunity" objects, "contact" objects, or the like. The data 632 associated with each virtual application 628 is provided to the database 630, as appropriate, and stored until it is requested or is otherwise needed, along with the metadata 638 that describes the particular features (e.g., reports, tables, functions, objects, fields, formulas, code, etc.) of that particular virtual application 628. For example, a virtual application 628 may include a number of objects 626 accessible to a tenant, wherein for each object 626 accessible to the tenant, information pertaining to its object type along with values for various fields associated with that respective object type are maintained as metadata 638 in the database 630. In this regard, the object type defines the structure (e.g., the formatting, functions and other constructs) of each respective object 626 and the various fields associated therewith.

Still referring to FIG. 6, the data and services provided by the server 602 can be retrieved using any sort of personal computer, mobile telephone, tablet or other network-enabled client device 640 on the network 645. In an exemplary embodiment, the client device 640 includes a display device, such as a monitor, screen, or another conventional electronic display capable of graphically presenting data and/or information retrieved from the multi-tenant database 630. Typically, the user operates a conventional browser application or other client program 642 (e.g., client application 107) executed by the client device 640 to contact the server 602 via the network 645 using a networking protocol, such as the hypertext transport protocol (HTTP) or the like. The user typically authenticates his or her identity to the server 602 to obtain a session identifier ("SessionID") that identifies the user in subsequent communications with the server 602. When the identified user requests access to a virtual application 628, the runtime application generator 620 suitably creates the application at run time based upon the metadata 638, as appropriate. As noted above, the virtual application 628 may contain Java, ActiveX, or other content that can be presented using conventional client software running on the client device 640; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to querying and other database functions, multi-tenancy, cloud computing, on-demand applications, code development, code distribution, compiling or decompiling, bytecode, programming syntax, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computing system comprising:
    a data storage element to maintain a code package comprising a plurality of classes, wherein for each class of the plurality of classes the data storage element maintains source code corresponding to the respective class and a compiled version of the source code; and
    a server comprising a processing system coupled to the data storage element and a network to:
        receive a request corresponding to a first class of the plurality of classes from the network;
        retrieve the compiled version of the source code corresponding to the first class from the data storage element;
        decompile the retrieved compiled version of the source code corresponding to the first class to obtain a decompiled version of the source code corresponding to the first class;
        analyze the decompiled version of the source code corresponding to the first class based on a global access modifier that permits selective viewing of global source code components associated with the first class to identify non-global source code components within the first class having a public access modifier and lacking the global access modifier;
        automatically filter the decompiled version of the source code corresponding to the first class to remove the non-global source code components and obtain filtered source code corresponding to the first class; and
        generate a visualization of the filtered source code corresponding to the first class, wherein the visualization of the filtered source code includes graphical representations of the global source code components of the first class designated with the global access modifier that permits selective viewing while the non-global source code components having the public access modifier are hidden from presentation in the visualization of the filtered source code.

2. The computing system of claim 1, the compiled version of the source code comprising bytecode corresponding to the first class, wherein the server generates a source code representation of the first class based on the bytecode and filters the source code representation corresponding to the first class based on the global access modifier associated with the first class to obtain the filtered source code corresponding to the first class.

3. The computing system of claim 1, wherein the server filters the decompiled version of the source code by removing the non-global source code components associated with a private access modifier or a protected access modifier.

4. The computing system of claim 1, the global source code components including global methods designated with the global access modifier, wherein the server modifies the global methods of the filtered source code to return null or nothing.

5. The computing system of claim 1, wherein the server modifies a method having the global access modifier within the filtered source code prior to the visualization.

6. The computing system of claim 1, wherein:
    the data storage element comprises a multi-tenant database;
    the server includes an application platform providing instances of a virtual application to a plurality of users;

a first user of the plurality of users is associated with a client device coupled to the network and providing the request; and a tenant identifier associated with the first user is different from a developer tenant identifier associated with the code package.

7. The computing system of claim 1, the server providing an instance of a virtual application within a client application on a client device coupled to the network, wherein the request is received from the client device and the visualization is presented within the client application on the client device.

8. The computing system of claim 6, wherein:

the server provides an instance of the virtual application within a client application on a client device coupled to the network;

the request is received from the client device; and the visualization is presented within the client application on the client device.

9. The computing system of claim 1, wherein the global source code components designated with the global access modifier can be used by any code that has access to the first class.

10. A method comprising:

providing, by a server over a network, a graphical representation of a plurality of classes of a package on a client device coupled to the network;

receiving, by the server from the client device over the network, a request to view a global class of the plurality of classes, the global class having a global access modifier that permits selective viewing of global source code components;

obtaining, by the server, a compiled version of source code associated with the global class from a database;

decompiling the compiled version of the source code associated with the global class to obtain a decompiled version of the source code;

analyzing the decompiled version of the source code based on the global access modifier to identify non-global source code components within the global class having a public access modifier and lacking the global access modifier;

automatically filtering, by the server, the decompiled version of the source code based on the global access modifier to remove the non-global source code components having the public access modifier and lacking the global access modifier from the decompiled version of the source code and obtain filtered code corresponding to the global class, the filtered code including the global source code components of the global class, the global source code components being designated with the global access modifier; and providing a visualization of the global class comprising a graphical representation of the filtered code on the client device, wherein the graphical representation of the filtered code includes graphical representations of the global source code components while the non-global source code components of the global class that have the public access modifier and lack the global access modifier are hidden from presentation in the visualization of the global class.

11. The method of claim 10, further comprising, prior to receiving the request:

compiling, by the server, the source code corresponding to the global class to obtain the compiled version of the source code; and storing, by the server, the compiled version of the source code in the database, wherein:

the filtered code comprises a source code representation of the global source code components of the global class generated based on the compiled version of the source code; and the visualization comprises a graphical representation of the source code representation of the global source code components of the global class.

12. The method of claim 10, wherein the non-global source code components comprise private or public components.

13. The method of claim 10, further comprising modifying a return of a global method of the global source code components prior to providing the graphical representation of the filtered code, wherein the global method is designated with the global access modifier and the graphical representation of the filtered code depicts the modified return of the global method.

14. The method of claim 10, wherein:

providing the graphical representation of the plurality of classes comprises displaying a listing of the plurality of classes within a graphical user interface (GUI) display associated with a virtual application on the client device;

receiving the request comprises identifying selection of the global class within the listing; and providing the visualization comprises displaying the filtered code within a source editor region of the GUI display associated with the virtual application.

15. The method of claim 10, wherein the global source code components designated with the global access modifier can be used by any code that has access to the global class.

16. A method of providing visualizations of components of a managed code package within a database system comprising an application server coupled to a database, the method comprising:

receiving, at the application server from a client device coupled to a network, a request to view a component of the managed code package having a global access modifier of a plurality of access modifiers associated therewith, the global access modifier designating availability for presentation wherein the request corresponding to a first class of the plurality of classes from the network;

obtaining, by the application server from the database, compiled source code associated with the component of the managed code package;

decompiling the compiled source code associated with the component of the managed code package to obtain decompiled source code associated with the component of the managed code package;

analyze the decompiled version of the source code corresponding to the first class based on the global access modifier that permits selective viewing of global source code components associated with the first class to identify non-global source code components within the first class having a public access modifier and lacking the global access modifier;

automatically removing, by the application server, the non-global source code components of the decompiled source code associated with the public access modifier of the plurality of access modifiers to restrict presentation of the non-global source code components designated with the public access modifier and obtain filtered source code associated with the component, wherein the filtered source code includes global source code components associated with the global access modifier; and providing, by the application server on the client device, a visualization of the filtered source code that includes the global source code components designated with the global access modifier while the non-global source code components associated with the public access modifier that lack the global access modifier are hidden from presentation in the visualization of the filtered source code.

17. The method of claim 16, further comprising, prior to receiving the request:

receiving, at the application server from a second client device coupled to the network, source code for the managed code package;

compiling, by the application server, the source code for the managed code package resulting in a compiled version of the source code for the managed code package, wherein the compiled version of the source code for the managed code package includes the compiled source code associated with the component of the managed code package; and storing, by the application server, the compiled version of the source code for the managed code package in the database.

* * * * *